United States Patent
Spillman et al.

(10) Patent No.: US 6,635,381 B2
(45) Date of Patent: Oct. 21, 2003

(54) ELECTROCHEMICAL LITHIUM ION SECONDARY CELL HAVING A SCALLOPED ELECTRODE ASSEMBLY

(75) Inventors: David M. Spillman, Tonawanda, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 194 days.

(21) Appl. No.: 09/799,394

(22) Filed: Mar. 5, 2001

(65) Prior Publication Data

US 2002/0122975 A1 Sep. 5, 2002

Related U.S. Application Data (60) Provisional application No. 60/203,694, filed on May 11, 2000.

(51) Int. Cl.[7] ................................................. H01M 2/26
(52) U.S. Cl. .................. 429/161; 429/128; 429/231.95; 429/94; 29/623.1
(58) Field of Search ................................ 429/128, 161, 429/94, 231.95; 29/623.1

(56) References Cited

U.S. PATENT DOCUMENTS

| | | | |
|---|---|---|---|
| 2,422,045 A | 6/1947 | Ruben | |
| 3,169,889 A | 2/1965 | Zahn | |
| 3,837,925 A | 11/1974 | Cailley et al. | |
| 3,856,575 A | 12/1974 | Hughes | |
| 5,045,415 A | 9/1991 | Witehira | |
| 5,154,989 A | 10/1992 | Howard et al. | |
| 5,525,441 A | 6/1996 | Reddy et al. | |
| 5,776,628 A | * | 7/1998 | Kraft et al. .................. 429/94 |

FOREIGN PATENT DOCUMENTS

| | | |
|---|---|---|
| EP | 0 690 520 A1 | 1/1996 |
| JP | 2002134096 | 5/2002 |

* cited by examiner

Primary Examiner—Laura Weiner
(74) Attorney, Agent, or Firm—Michael F. Scalise (57) ABSTRACT

A lithium ion secondary battery having an irregular shape with a unitary anode and unitary cathode that are spirally wound and that provide a high energy density for an implantable biomedical device.

32 Claims, 6 Drawing Sheets

ELECTROCHEMICAL LITHIUM ION SECONDARY CELL HAVING A SCALLOPED ELECTRODE ASSEMBLY

CROSS-REFERENCE TO RELATED APPLICATION

The present application claims priority based on U.S. provisional patent application Serial No. 60/203,694, filed May 11, 2000, entitled "Electrochemical Lithium Ion Secondary Cell Having a Scalloped Electrode Assembly," which is incorporated herein by reference.

FIELD OF THE INVENTION

The present invention generally relates to the conversion of chemical energy to electrical energy, and more particularly, to a rechargeable alkali metal electrochemical cell, particularly a lithium-ion secondary cell.

BACKGROUND OF INVENTION

Lithium secondary cells have been under development for many years. Early efforts focused on the use of a lithium anode coupled with metal oxide and metal sulfide cathode materials such as manganese dioxide, titanium disulfide, and others. Despite the enormous amount of research performed on lithium secondary systems, cells with metallic lithium anodes have not found widespread commercial use. Of concern are the inherent safety problems associated with them. During use, lithium plating can occur in an undesirable manner with dendritic lithium penetrating through the separator and short circuiting the cell. In addition to rendering the cell inoperative, this condition can cause the cell to vent or, in extreme cases, to explode.

During the past decade, increased attention has focused on the use of electrode materials which are capable of more effectively intercalating and de-intercalating lithium ions than the previously used metal oxides and metal sulfides. Cells incorporating such second generation electrode materials are typically referred to as lithium-ion or lithium-rocking chair systems. Although the energy density of these secondary cells is lower than that of primary cells containing lithium metal anodes, they exhibit a higher open circuit voltage, an acceptably high operating voltage and, in many cases, equivalent or better rate capability than many previously developed lithium secondary systems. Most importantly, their safety is generally accepted to be much better.

Presently, lithium-ion secondary cells are used in a large number of commercial applications including telephones, camcorders and other portable electronic equipment. They have been made in a variety of shapes, sizes and configurations including coin, button, cylindrical and prismatic cells. There are several other applications, however, for which rechargeable lithium cells and, in particular, lithium-ion secondary cells may be used but for which present day constructions are unsuitable. Such applications include medical instruments, implantable medical devices and surgical tools.

For many of these applications, the use of prior art lithium-ion secondary cells is unacceptable due to their shape and construction. In certain types of medical applications, prismatic cells which are sized and shaped for use within the human body are most preferred.

U.S. Pat. No. 3,169,889 to Zahn shows a storage cell having electroplates and a separator that are "scalloped" so as to conform to the cell profile when the assembly is folded (see FIGS. 1 and 2 of the Zahn patent).

U.S. Pat. No. 3,856,575 to Hughes relates to an electric cell with electroplates that are appropriately shaped and spaced to be accommodated in cylindrical casings, but not wound therein.

U.S. Pat. No. 2,422,045 to Ruben is representative of wound structures in batteries (see FIGS. 3 and 13 of the Ruben patent).

None of these patents disclose a wound cell structure for a lithium-ion secondary cell.

Accordingly, there exists the need for lithium-ion secondary cells which are, among other things, spirally wound and have a shape suitable for use with implantable medical devices.

SUMMARY OF THE INVENTION

The present invention meets the above-described need by providing a high energy density lithium ion secondary cell having an irregular shape. The secondary electrochemical cell includes a negative electrode comprising a negative electrode active material which intercalates with an alkali metal, and a positive electrode comprising a positive electrode active material which intercalates with the alkali metal. The negative electrode and the positive electrode are electrochemically associated with each other and housed in an irregular-shaped casing. The electrodes are disposed such that a periphery of the positive electrode is completely bounded by a periphery of the negative electrode to prevent alkali metal from plating as the cell is repeatedly cycled between a charged and a discharged condition. An electrolyte solution activates the negative and positive electrodes. The cell includes unitary anode and cathode electrodes having an irregular shape that are spirally wound or folded with a suitable separator to form a lithium-ion secondary cell that is capable of use in an implantable biomedical device.

DETAILED DESCRIPTION OF THE DRAWINGS

DETAILED DESCRIPTION OF THE PREFERRED EMBODIMENTS

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, pitch carbon, synthetic carbon, mesocarbon microbeads (MCMB), and mixtures thereof) which are capable of reversibly retaining the lithium species, is preferred. Graphite is particularly preferred due to its relatively high lithium-retention capacity. A preferred form of graphite is characterized by irregularly shaped particles which are commercially available from Nippon Carbon Co., Ltd. in Yokohama, Japan. A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), a polyamide or a polyimide, and mixtures thereof. To form an anode electrode, this active admixture is contacted to a metallic current collector. The metallic current collector is usually made from a thin foil of copper, nickel, nickel plated steel, stainless steel or titanium, with copper being preferred. The current collector may also be chemically etched, perforated, or of expanded metal screen. The anode current collector may or may not be coated or treated to prevent corrosion. The carbonaceous anode mixture may be associated with the current collector by casting, pressing, rolling or otherwise contacting the active admixture thereto.

The anode electrode 10 (FIGS. 1, 4, and 5) of the present invention is typically provided with a metallic lead (not shown) welded to the anode current collector (not shown). The lead material may consist of copper, nickel, nickel plated steel, stainless steel or titanium, depending on the anode current collector material used, the case and lid materials used and the degree of magnetic susceptibility required for the cell. The anode lead may be welded to the current collector using various methods including, but not limited to, resistance welding, plasma welding, ultrasonic welding or laser welding. The anode lead is then weld contacted to a cell case of conductive metal in a case-negative electrical configuration, as will be described hereinafter.

The cathode 13 (FIGS. 2, 4, and 5) of a secondary cell according to the present invention includes a metal oxide, a metal sulfide, a metal selenide or a metal telluride of a transition metal element. Such metals include vanadium, titanium, chromium, copper, molybdenum, niobium, iron, nickel, cobalt and manganese. The cathode active material is preferably lithiated when the cell is manufactured and may or may not be used in combination with other metal oxide or metal sulfide materials. Lithiated materials are preferred because they are stable in air and readily handled. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into a cathode electrode for incorporation into a lithium-ion secondary cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The cathode electrode 13 further comprises a fluoro-resin binder, preferably in a powder form, such as PTFE, PVDF, ETFE, a polyamide or a polyimide, and mixtures thereof.

To form a cathode electrode, the cathode active material, conductive agent and the binder material are mixed and subsequently contacted to a metallic current collector. The current collector (not shown) is usually made from a thin metallic foil. Aluminum is a particularly preferred material for the cathode current collector since it is very conductive, has a relatively low magnetic susceptibility and is relatively inexpensive and stable within the confines of the cell environment. Additionally, other forms of a current collector may be used including a chemically etched, perforated or expanded metal screen, depending on the particular requirements of the processes used to manufacture the cell. The cathode current collector may or may not be coated or treated to prevent corrosion.

The cathode current collector may be contacted directly to the terminal pin, or the current collector may be contacted to a lead that is, in turn, connected to the terminal pin. U.S. Pat. No. 5,750,286 to Paulot et al., which is assigned to the assignee of the present invention and incorporated herein by reference, shows a cathode current collector welded directly to the terminal pin. In cases where a cathode lead is used, the lead material is usually aluminum or a high ferritic stainless steel such as 29-4-2 stainless steel, and is welded to the current collector by one of several methods including resistance welding, plasma welding, ultrasonic welding or laser welding.

To discharge a secondary cell constructed according to the present invention, lithium-ions comprising the lithiated cathode active material are intercalated into the carbonaceous anode by applying an externally generated electrical potential to recharge the cell. The applied recharging electrical potential serves to draw lithium ions from the cathode material, through the electrolyte and into the carbonaceous anode to saturate the carbon comprising the anode. The cell is then provided with an electrical potential and discharged in a normal manner.

The secondary cell of the present invention includes a separator 150 to provide physical segregation between the anode and cathode active electrodes. The separator 150 (FIGS. 4 to 7) is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. The form of the separator 150 typically is a sheet which is placed between the anode and cathode electrodes.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, polyamides, polyimides, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The choice of an electrolyte solvent system for activating a rechargeable alkali metal electrochemical cell, and particularly a fully charged lithium-ion secondary cell is very limited due to the high potential of the cathode material (up to 4.3 V vs. $Li/Li^+$ for $Li_{1-x}CoO_2$) and the low potential of the anode material (0.01 V vs. $Li/Li^+$ for graphite). Suitable nonaqueous electrolytes are comprised of an inorganic salt dissolved in a nonaqueous solvent and more preferably an alkali metal salt dissolved in a mixture of organic carbonate solvents comprising dialkyl (non-cyclic) carbonates selected from dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof, and cyclic carbonates selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials. The ester γ-butyrolactone is also a useful solvent for activating a lithium-ion secondary cell according to the present invention.

Known lithium salts that are useful as a vehicle for transport of alkali metal ions from the anode to the cathode, and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof. Suitable salt concentrations typically range between about 0.2 to 1.5 molar.

The type of housing used is dependent on the type of cell design desired. Prismatic enclosures may be manufactured from a deep drawing process, a powdered metal injection molding process or one of a number of processes which are well known for making battery enclosures. The case may also consist of a rectangular tube housing to which a top header assembly and bottom lid are welded. Such a construction is shown in U.S. Pat. No. 5,756,229 to Pyszczek et al., which is assigned to the assignee of the present invention and incorporated herein by reference.

An important aspect of the present invention is that the width and length of the cathode electrode are shorter or smaller than that of the anode electrode. In other words, the cathode material is completely bounded by the anode material so as not to cause lithium plating. Therefore, that portion of the anode electrode which contains electrochemically active components extends beyond the cathode electrode at the end of the cell wind. Likewise, at the beginning of the cell wind, enough of the uncoated portion of the cathode current collector is provided to ensure that it is opposite a portion of the anode active sheet. Should the electrochemically active cathode material, which is laminated to the cathode current collector, not be completely opposed by electrochemically active anode material, the possibility exists that lithium metal will plate within the cell. This is undesirable as it may compromise the performance or the safety of the cell. Finally, it should be noted that the separator length and width extend beyond that of the anode assembly.

After the electrode assembly is wound and inserted into the casing, the anode lead is welded to the interior of the casing at one or more of a number of locations. Depending on the cell design, the anode lead may be welded to the inside of the case or to the underside of the header. Additionally, the anode lead may be pinched between the lid and the case and subsequently fused as the lid and case are hermetically welded together. Methods of welding the anode lead to the case, to the lid or to both include resistance welding, plasma welding, ultrasonic welding and laser welding. Regardless of where the anode lead is welded to the case, the header assembly is hermetically welded to the case.

An alternate method of assembling the cell involves winding the anode and cathode electrode on a mandrel, removing the mandrel from the wind and inserting the wound electrode assembly into a cell case or container. In such a design, an elongated terminal pin is not required. Instead, a cathode lead is welded to the current collector by one of numerous welding methods such as resistance welding, plasma welding, ultrasonic welding or laser welding. The cathode lead is then welded directly to the terminal pin. The cathode lead may be rounded, flattened, chemically etched or mechanically roughened in order to facilitate welding. Additionally, a tubular couple may be initially welded to the cathode lead with the cathode assembly subsequently welded to the couple. This latter terminal pin construction is shown and described in the previously referenced U.S. Pat. No. 5,250,373 to Muffoletto et al.

Regardless of the winding method, the cell is thereafter filled with the electrolyte solution described hereinabove. This above assembly describes a case-negative cell which is the preferred construction for the lithium-ion secondary cell of the present invention. As is well known to those skilled in the art, the electrochemical system of the present invention can also be constructed in a case-positive configuration.

Figure 1:
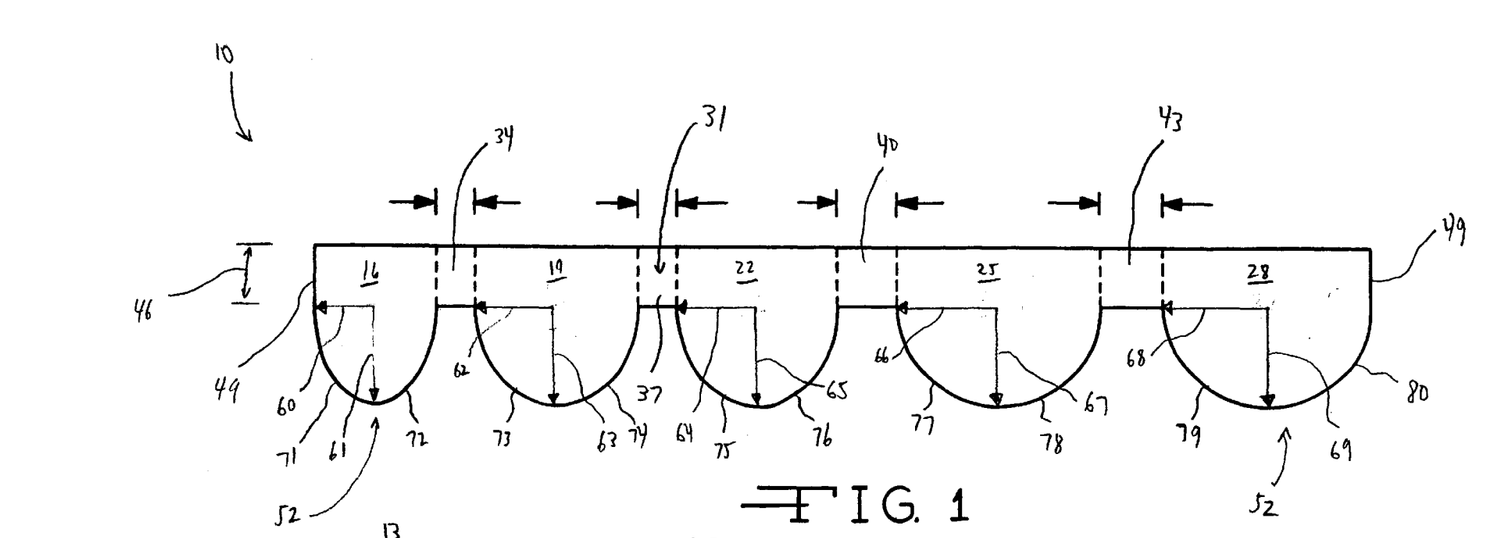
FIG. 1 is a top plan view of an anode electrode of the present invention.
Figure 2:
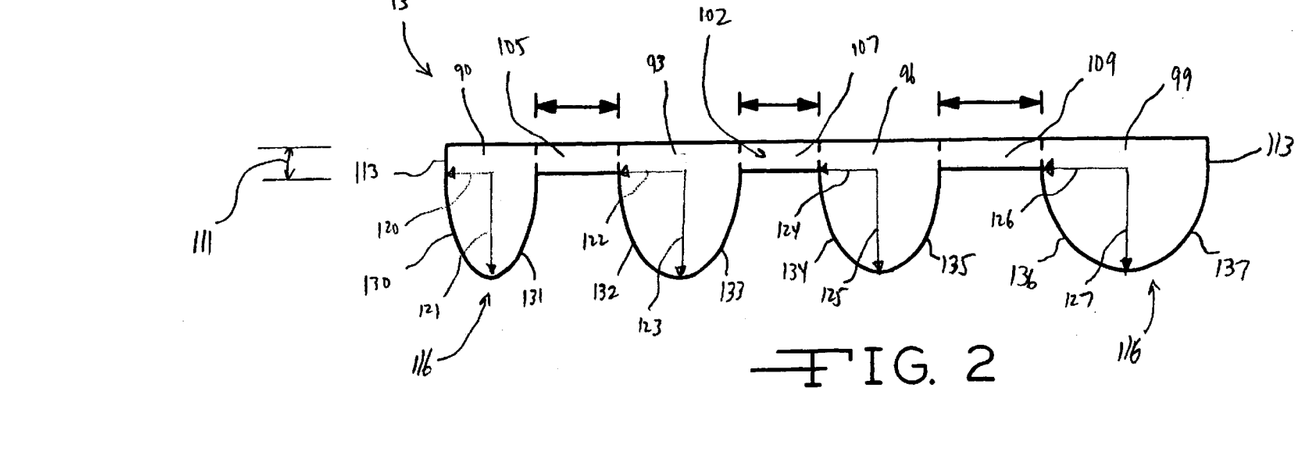
FIG. 2 is a top plan view of a cathode electrode of the present invention.

Turning now to the drawings, FIG. 1 shows a unitary anode (negative electrode) assembly 10 of the present invention. A unitary cathode (positive electrode) assembly 13 is shown in FIG. 2. The anode assembly 10 has five plates designated as 16, 19, 22, 25, and 28. The plates are scalloped with each plate having a semi-circular or semi-elliptical portion and are connected by a first continuous metallic element 31. Other irregular shapes may also be suitable depending on the specific application. The continuous metallic element 31 is divided into sections 34, 37, 40, and 43. The anode assembly 10 may include less than or greater than five plates. Also, a separate metallic element which is not shown may be extended from any part of the anode to a terminal of the battery in order to establish electrical continuity, or any part of the anode may be welded directly to a terminal of the battery.

The sections 34, 37, 40, and 43 that connect the various plates together may or may not be coated with electrochemically active materials, and it is not necessary that all metallic connecting portions 34–43 be either coated or uncoated. Typically, metallic connecting portion 34 will be shorter than metallic connecting portion 37 or 40, and metallic connecting portion 37 or 40 will be shorter than metallic connecting portion 43. Also, the length of metallic connecting portion 37 may be shorter than or equal to that of portion 40. The length of the various metallic connecting portions 34, 37, 40 and 43 will depend on the particular design of the battery, but the length of any metallic connecting portion will be equal to or greater than that of the portion immediately preceding it, when viewed in FIG. 1 from left to right.

The width of the metallic connecting portions may or may not be continuous across the entire anode assembly 10. In FIG. 1, the width is constant and is designated 46.

Typically each plate 16, 19, 22, 25, and 28 will have characteristic dimensions that may or may not be equal, depending on the battery design and the method of assembly. In the present example, each plate has a straight length 49 and an attached semi-elliptical or semi-circular shape 52. The radii of the semi-elliptical or semi-circular portions of the plates are 60, 61, 62, 63, 64, 65, 66, 67, 68, or 69. There are no specific relationships among these radii since their values will depend on the shape, geometry, and method of construction of the battery, but they are shown to establish a reference to a fixed point within the boundaries of the anode plate 10. Also, shown are curved surfaces 71, 72, 73, 74, 75, 76, 77, 78, 79, and 80 which define the outer boundaries of the various anode plates. There are no specific relationships between the geometry of these curved surfaces and straight surfaces and their values will depend on the geometry and the method of construction of the battery.

In FIG. 2, the cathode assembly 13 is shown. Four plates designated as 90, 93, 96, and 99 are connected by a second continuous metallic connecting element 102 having metallic connecting portions 105, 107, and 109. There may be more than four plates depending on the particular aspects of the design. A separate metallic element (not shown) may be extended from any part of the cathode assembly 13 to a terminal of the battery in order to establish electrical continuity, or any part of the cathode may be welded directly to a terminal of the battery.

The metallic connecting portions that connect the various plates together may or may not be coated with electrochemically active materials, and it is not necessary that all second metallic connecting portions be either coated or uncoated. Some of the connecting portions may be coated while one or more may not be coated. Typically, connecting portion 105 will be shorter than metallic connecting portion 107 or 109. The length of the various metallic connecting portions will depend on the particular design of the battery, but the length of any metallic connecting portion 105, 107, 109 or 110 will be equal to or greater than that of the portion immediately preceding it as viewed from left to right in FIG. 2.

The width (indicated by arrow 111) of the metallic connecting element 102 may or may not be continuous across the entire cathode assembly.

Typically each plate will have characteristic dimensions that may or may not be equal, depending on the battery design and the method of assembly. In the present example, each plate has a straight length 113 and an attached semi-elliptical or semi-circular shape 116. The radii of the semi-elliptical or semi-circular portions of the plates are 120, 121, 122, 123, 124, 125, 126, or 127. There are no specific relationships among these radii since their values will depend on the shape, geometry, and method of construction of the battery, but they are shown to establish a reference to a fixed point within the boundaries of the cathode plate 13. Also, shown are curved surfaces 130, 131, 132, 133, 134, 135, 136, and 137, which define the outer boundaries of the various cathode plates. There are no specific relationships between the geometry of these curved surfaces and straight surfaces and their values will depend on the geometry and the method of construction of the battery.

Figure 3:
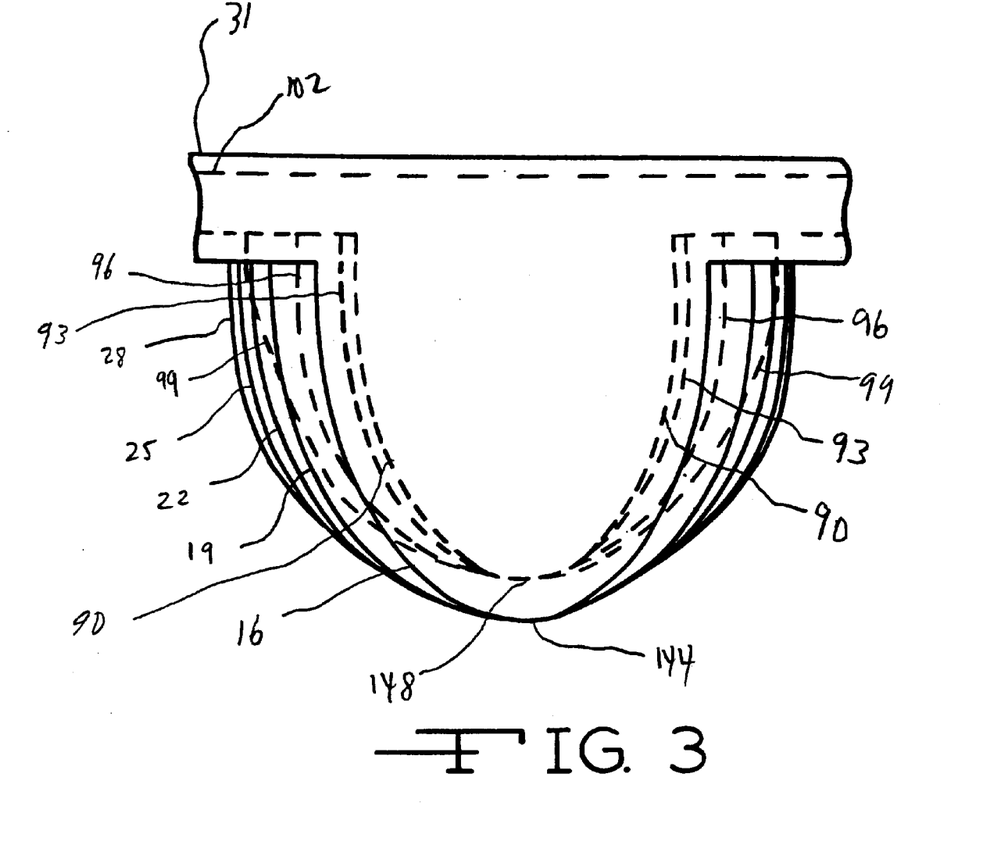
FIG. 3 is a front elevation view of the combined electrodes after they have been spirally wound.

In FIG. 3, the profile of the cell stack assembly 140 is shown. Viewing the cell stack assembly 140 from the outside inward, the order of the alternating anode and cathode plates is 28, 99, 25, 96, 22, 93, 19, 90, and 16. Anode plate 28 is the largest and cathode plate 99 is directly adjacent to it. Cathode plate 99 is contained within the boundaries of anode plate 28. Cathode plate 99 should also be contained within the boundaries of anode plate 25 which would be positioned third in the cell stack assembly when viewed from the outside. Cathode plate 96 should also be contained within the boundaries of anode plates 25 and 22.

Cathode plate 99 may be larger than anode plate 22, so long as it is not larger than anode plates 28 and 25 which are positioned adjacent to it. Cathode plate 93 is sixth in line and is contained within the boundaries of anode plate 22.

Independent of the radii of the various electrode plates, the apex 144 of all of the anode plates 16, 19, 22, 25 and 28 and the apex of all of the cathode plates 90, 93, 96 and 99 may be a common point at the bottom of the cell stack assembly. Also, the apex 148 of the cathode plates lies within the boundaries of the anode plates.

The metallic connecting element 102 should be positioned within the metallic connecting element 31, particularly within regions that are directly opposed and contain electrochemically active materials.

The cathode plate area throughout the cell stack assembly is maximized within the boundaries of the two adjoining anode plates, and any means for providing this relationship within a given case geometry will provide for a cell with the highest possible energy density.

Figure 4:
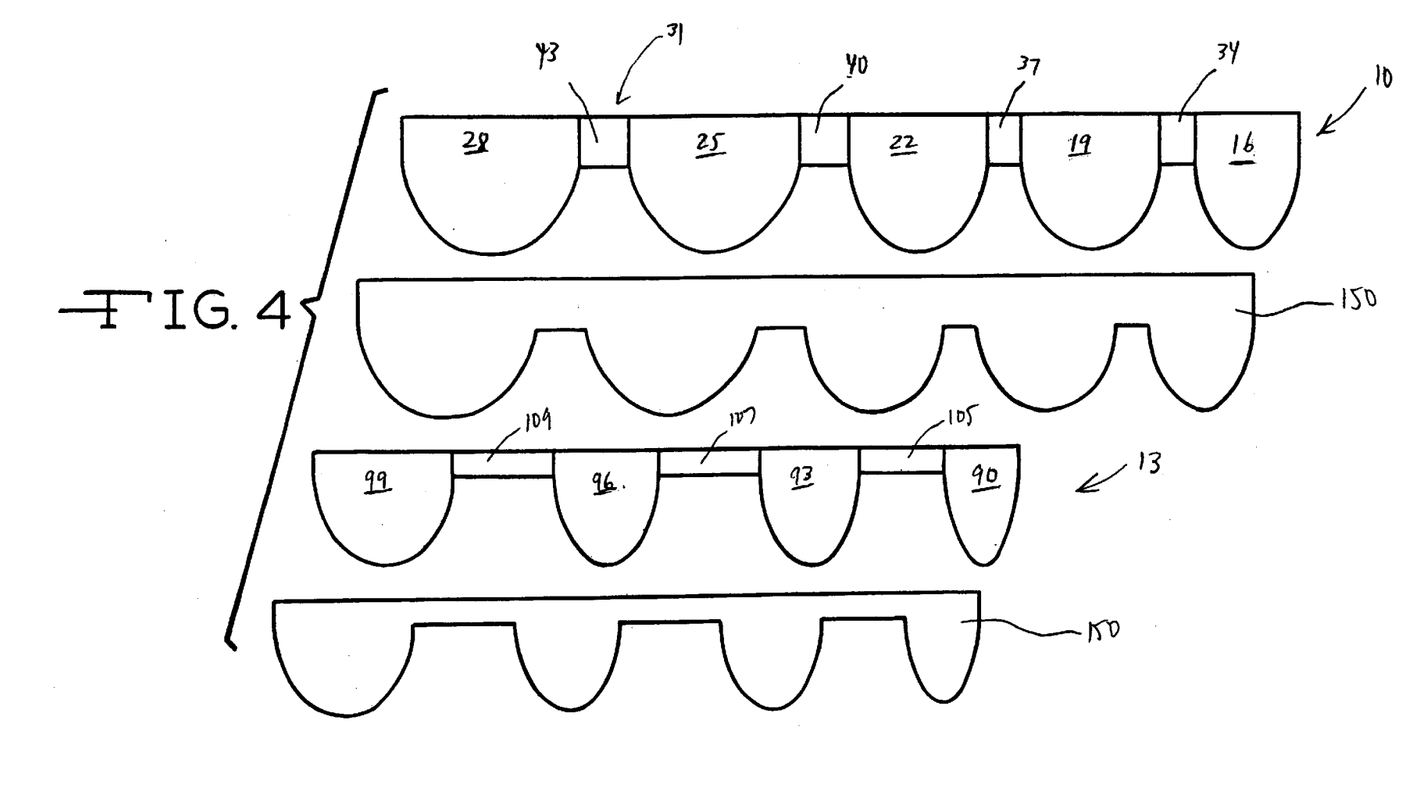
FIG. 4 is a top plan view of the electrodes and separator of the present invention.
Figures 5, 6:
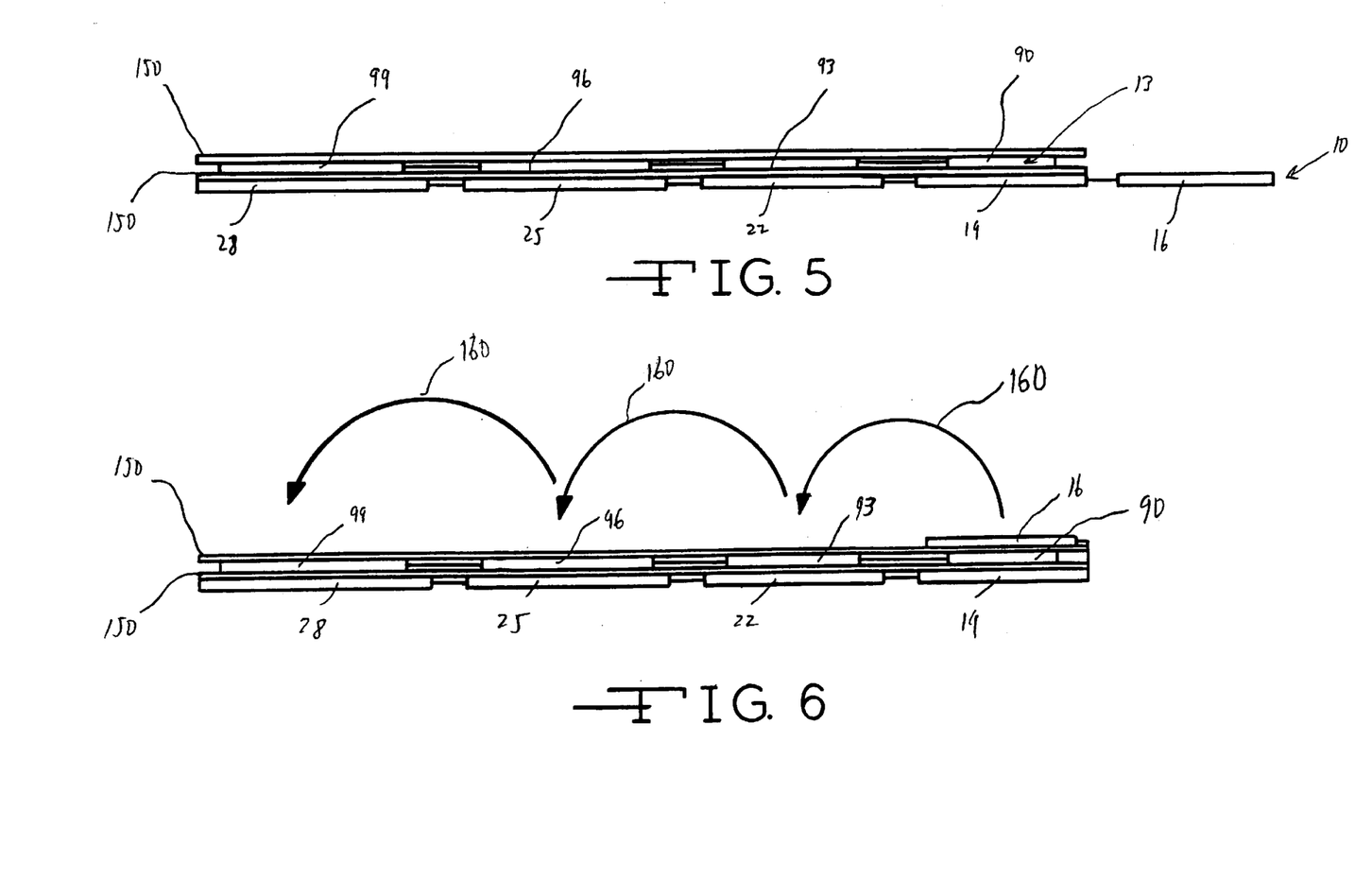
FIG. 5 is a side elevation view of a cell stack having the electrodes of the present invention prior to winding.
FIG. 6 is a side elevational view of a partially wound cell stack of the present invention.
Figure 7:
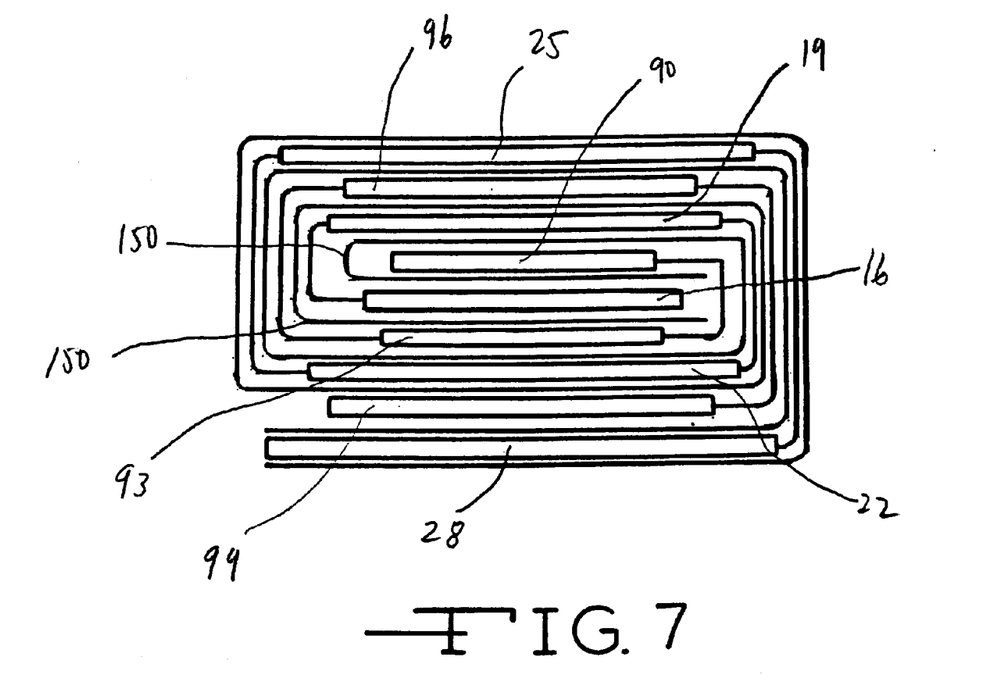
FIG. 7 is a side elevational view of a wound cell stack of the present invention; and, FIG. 8 is a sectional end view of an alternate embodiment of the present invention.

Turning to FIGS. 4–7, the cell stack assembly 140 of the present invention may be assembled by placing two sheets of separator 150 on opposite sides of the cathode electrode 13 as shown in FIGS. 4 and 5. The separator is included between the anode and the cathode, and completely covers the electrodes so as to prevent direct contact between the anode and the cathode. The separator may consist of individual pieces that are placed between the anode and the cathode as shown in FIGS. 4–5, or an elongated piece that is cut to a specific profile and shape such that it prevents direct contact between the anode and the cathode in the cell stack assembly, or it may be heat sealed directly around the anode, the cathode, or both. Next, the combined electrode strips and separator are wound by starting at one end and winding toward the opposite end as indicated by arrows 160 in FIG. 6. The cell stack may be wound about a mandrel to form the shape shown in FIG. 7. Different shapes and sizes of mandrels may be used depending on the cell geometry. Also, the electrodes 10 and 13 may be wound from the center as known to those of ordinary skill in the art.

Figure 8:
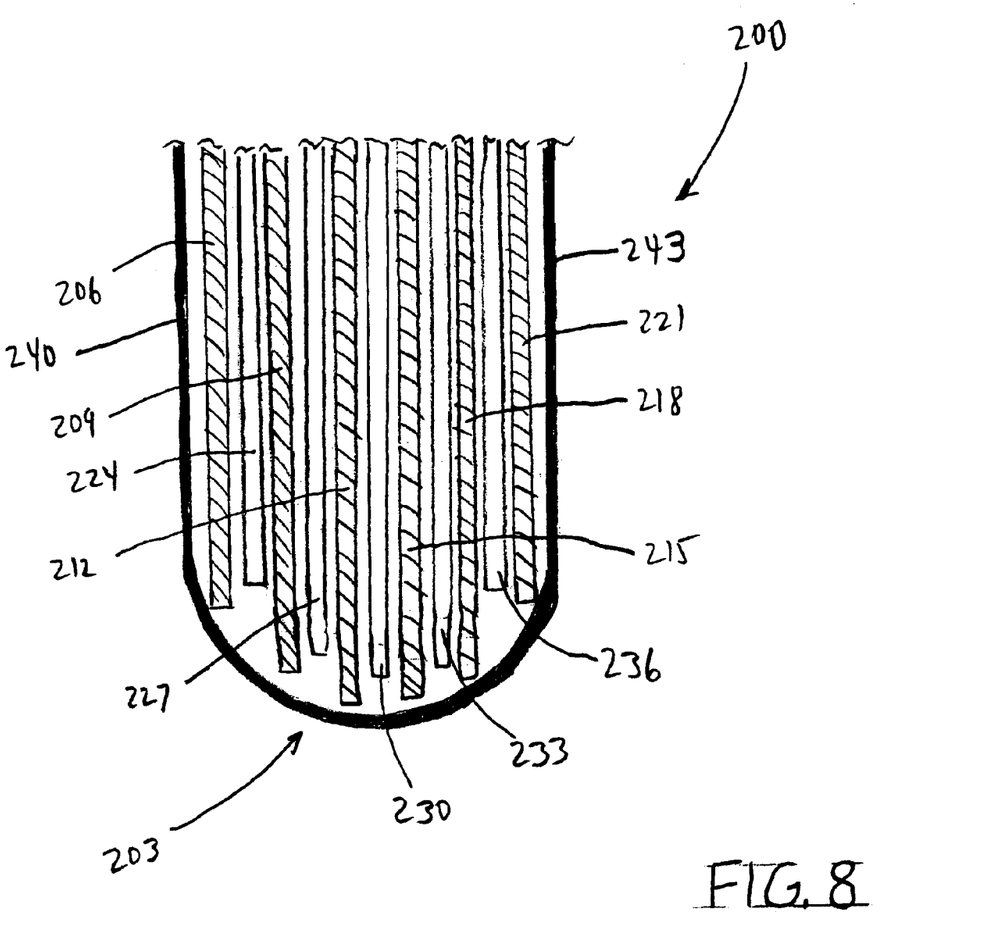

In FIG. 8 an alternate embodiment of the present invention provides a cell stack suitable for use in a case 200 having a curved bottom section 203. A continuous anode electrode includes six plates 206, 209, 212, 215, 218, and 221. Other numbers of plates would also be suitable depending on the cell geometry as known to those of ordinary skill in the art. Alternatively, the electrode assembly may be formed by stacking the electrodes and then folding the combined electrodes in sections from end-to-end.

A continuous cathode electrode contains five plates 224, 227, 230, 233, and 236 as shown. Other numbers of plates would also be suitable depending on the cell geometry. The respective plates for the positive and negative electrodes are arranged such that the largest positive and negative plates are disposed in the center of the curved bottom surface. As the curved bottom surface extends toward the side walls 240 and 243, the amount of space at the bottom of the casing decreases. Accordingly, the smaller positive and negative plates are disposed closer toward the side walls 240 and 243. As a result, the cell stack maintains the relationship between each positive electrode plate and its adjacent larger negative electrode plates and also maximizes the volumetric efficiency of the cell so that more active material can be used because the plates extend toward the bottom of the casing such that they conform to the curvature of the bottom wall.

Accordingly, the present invention provides a lithium ion secondary battery having an irregular shape with a unitary anode and unitary cathode that are spirally wound or folded and that provide a high energy density for an implantable biomedical device.

It is appreciated that various modifications to the present inventive concepts described herein may be apparent to those of ordinary skill in the art without departing from the spirit and scope of the present invention as defined by the herein appended claims.

What is claimed is:

1. A secondary electrochemical cell, which comprises:
a) a casing;
b) a unitary negative electrode comprising at least three negative plates, each having spaced apart first and second major sides joined by a negative peripheral edge, wherein the first and second major sides are contacted with a negative electrode active material that intercalates with an alkali metal, and wherein the negative plates are connected together by negative connecting portions;
c) a unitary positive electrode comprising at least two positive plates, each having spaced apart third and fourth major sides joined by a positive peripheral edge, wherein the third and fourth major sides are contacted with a positive electrode active material that intercalates with the alkali metal, and wherein the positive plates are connected together by a positive connecting portion;
d) a separator disposed between the negative electrode and the positive electrode;
e) wherein the negative electrode and positive electrode are electrochemically associated with each other as an electrode assembly housed in the casing to provide the positive plates interleaved between the negative plates with one of the negative plates disposed immediately adjacent to the opposite third and fourth major sides of the two positive plates, and wherein the positive peripheral edges of each positive plate are completely bounded by the negative peripheral edges of the immediately adjacent negative plates to prevent alkali metal from plating as the cell is repeatedly cycled between a charged and a discharged condition, and wherein the negative plates are sized such that in the electrode assembly an intermediate second negative plate has a larger periphery than both a first and third negative plates opposite the first and second major sides of the second negative plate; and
f) an electrolyte solution activating the negative and positive electrodes.

2. The secondary electrochemical cell of claim 1, wherein the plates have an irregular shape.

3. The secondary electrochemical cell of claim 1, wherein the negative and positive plates have at least one common side of a semi-circle shape.

4. The secondary electrochemical cell of claim 1, wherein the negative and positive plates have at least one common side of a semi-ellipse shape.

5. The secondary electrochemical cell of claim 1, wherein the positive plates have an irregular shape.

6. The secondary electrochemical cell of claim 1, wherein the negative and positive electrode are spirally wound to form the electrode assembly.

7. The secondary electrochemical cell of claim 1, wherein there at least five negative plates and at least four positive plates and the largest negative plate is disposed in the center of the electrode assembly and the negative plates disposed on opposite sides of the largest negative plate become gradually smaller as the distance from the largest negative plate increases.

8. The secondary electrochemical cell of claim 1, wherein the negative and positive electrodes are wound or folded to form the electrode assembly.

9. A secondary electrochemical cell, comprising:
a) a casing;
b) a unitary negative electrode comprising at least two negative plates, each having spaced apart first and second major sides joined by a negative peripheral edge, wherein the first and second major sides are contacted with a negative electrode active material that intercalates with an alkali metal, and wherein the negative plates are connected together by a negative connecting portion;
c) a unitary positive electrode comprising at least one positive plate having spaced apart third and fourth major sides joined by a positive peripheral edge, wherein the third and fourth major sides are contacted with a positive electrode active material that intercalates with the alkali metal;
d) a separator disposed between the negative electrode and the positive electrode
e) wherein the negative electrode and positive electrode are electrochemically associated with each other as an electrode assembly housed in the casing to provide the positive plate interleaved between the negative plates with one of the negative plates disposed immediately adjacent to the opposite third and fourth major sides of the positive plate, and wherein the positive peripheral edge of the positive plate is completely bounded by the negative peripheral edges of the adjacent negative plates to prevent alkali metal from plating as the cell is repeatedly cycled between a charge and a discharged condition and wherein the negative plates are sized such that in the electrode assembly one of the negative plates has a larger peripheral edge than the other negative plate;
f) an electrolyte solution activating the negative and positive electrodes; and,
g) wherein the negative and positive electrode are spirally wound or folded to form the electrode assembly.

10. The secondary electrochemical cell of claim 2 wherein there are at least three negative plates, each having spaced apart first and second major sides joined by a negative peripheral edge, the negative plates connected together by negative connection portions, and at least two positive plates, each having spaced apart third and fourth major sides joined by a positive peripheral edge, the positive plates connected together by a positive connecting portion, and wherein in the electrode assembly, the positive plates are interleaved between the negative plates with one of the negative places disposed immediately adjacent to the opposite third and fourth major sides of two positive plates with the positive peripheral edges of each positive plate completely bounded by the negative peripheral edges of the immediately adjacent negative plates.

11. The secondary electrochemical cell of claim 10 wherein the negative plates increase in size from a first end of the electrode assembly to an opposite end thereof.

12. The secondary electrochemical cell of claim 10 wherein the negative connecting portions increase in length from a first end of the electrode assembly to an opposite end thereof.

13. The secondary electrochemical cell of claim 10 wherein there are at least three positive plates connected together by positive connecting portions, the positive connecting portions increasing in length from a first end of the electrode assembly to an opposite end thereof.

14. The secondary electrochemical cell of claim 10 wherein the positive plates increase in size from a first end of the electrode assembly to an opposite end thereof.

15. The secondary electrochemical cell of claim 10 wherein the connecting portions of the positive electrode are coated with an electrochemically active material.

16. The secondary electrochemical cell of claim 10 wherein each of the positive plates of the electrode assembly has a common apex.

17. The secondary electrochemical cell of claim 9 of a lithium ion chemistry.

18. The secondary electrochemical cell of claim 9, wherein the connecting portions of the negative electrode are coated with an electrochemically active material.

19. The secondary electrochemical cell of claim 9, wherein the connecting portions are uncoated.

20. The secondary electrochemical cell of claim 9, wherein the negative plates of the negative electrode have an irregular shape.

21. The secondary electrochemical cell of claim 9, wherein the positive plate has an irregular shape.

22. The secondary electrochemical cell of claim 9, wherein the negative plates have a side formed in the shape of a semi-circle.

23. The secondary electrochemical cell of claim 9, wherein the positive plate has a side formed in the shape of a semi-circle.

24. The secondary electrochemical cell of claim 9, wherein each of the negative plates of the electrode assembly has a common apex.

25. The secondary electrochemical cell of claim 9, wherein the negative and positive electrodes are wound or folded to form the electrode assembly.

26. A method of assembling an electrode assembly for a secondary electrochemical cell, comprising:

a) providing a unitary negative electrode comprising at least three negative plates, each having spaced apart first and second major sides joined by a negative peripheral edge, and contacting the first and second major sides with a negative electrode active material that intercalates with an alkali metal, and wherein the negative plates are connected together by negative connecting portions;

b) providing a unitary positive electrode comprising at least two positive plates, each having spaced apart third and fourth major sides joined by a positive peripheral edge, and contacting the third and fourth major sides with a positive electrode active material that intercalates with the alkali metal, and wherein the positive plates are connected together by a positive connecting portion;

c) aligning the negative electrode and positive electrode in an electrode assembly housed in a casing with the positive plates interleaved between the negative plates such that one of the negative plates is disposed immediately adjacent to the opposite third and fourth major sides of the two positive plates, and wherein the positive peripheral edges of each positive plate are completely bounded by the negative peripheral edges of the immediately adjacent negative plates;

d) providing a separator disposed between the negative electrode and the positive electrode; and, e) preventing alkali metal from plating as the cell is repeatedly cycled between a charged and a discharged condition with the negative plates being sized such that in the electrode assembly an intermediate second negative plate has a larger periphery than both a first and third negative plates opposite the first and second major sides of the second negative plate.

27. The method of claim 26, wherein one side of each of the negative plates is formed in the shape of a semicircle.

28. The method of claim 26, wherein one side of each of the positive plates is formed in the shape of a semicircle.

29. The method of claim 26 wherein the connecting portions on the positive and negative electrodes are coated with an electrochemically active material.

30. The method of claim 26 wherein the connecting portions of the respective positive and negative electrodes are uncoated.

31. The method of claim 26, wherein the electrode assembly is formed by spirally winding the electrodes.

32. The method of claim 26, wherein the electrode assembly is formed by folding the electrodes.

* * * * *

UNITED STATES PATENT AND TRADEMARK OFFICE
CERTIFICATE OF CORRECTION

PATENT NO. : 6,635,381 B2  
DATED : October 21, 2003  
INVENTOR(S) : Spillman et al.

It is certified that error appears in the above-identified patent and that said Letters Patent is hereby corrected as shown below:

<u>Column 9,</u>
Line 55, after "there", please insert -- are --; and

<u>Column 10,</u>
Line 35, please delete "claim 2" and insert -- claim 9 --.

Signed and Sealed this

Tenth Day of February, 2004

JON W. DUDAS
*Acting Director of the United States Patent and Trademark Office*